US012790550B2

(12) United States Patent
Jo et al.

(10) Patent No.: US 12,790,550 B2
(45) **Date of Patent: *Nov. 10, 2026**

(54) METHOD AND SYSTEM FOR PRODUCING REFINED HYDROCARBONS FROM WASTE PLASTICS

(71) Applicant: SK INNOVATION CO., LTD., Seoul (KR)

(72) Inventors: Sang Hwan Jo, Daejeon (KR); Yong Woon Kim, Daejeon (KR); Soo Kil Kang, Daejeon (KR); Ik Hwan Na, Daejeon (KR); Min Gyoo Park, Daejeon (KR); Min Woo Shin, Daejeon (KR); Seung Han Yu, Daejeon (KR); Jin Seong Jang, Daejeon (KR); Yong Seong Jeong, Daejeon (KR)

(73) Assignee: SK INNOVATION CO., LTD., Seoul (KR)

( * ) Notice: Subject to any disclaimer, the term of this patent is extended or adjusted under 35 U.S.C. 154(b) by 125 days.

This patent is subject to a terminal disclaimer.

(21) Appl. No.: 18/628,812

(22) Filed: Apr. 8, 2024

(65) Prior Publication Data

US 2024/0352330 A1 Oct. 24, 2024

(30) Foreign Application Priority Data

Apr. 19, 2023 (KR) ........................ 10-2023-0051631
Nov. 27, 2023 (KR) ........................ 10-2023-0166857

(51) Int. Cl.
*C10G 1/10* (2006.01)
*B01D 3/14* (2006.01)
(Continued)

(52) U.S. Cl.
CPC ............... *C10G 1/10* (2013.01); *B01D 3/143* (2013.01); *B01D 39/06* (2013.01); *C10B 53/07* (2013.01);
(Continued)

(58) Field of Classification Search
CPC ... C10G 1/002; C10G 1/10; C10G 2300/1003
See application file for complete search history.

(56) References Cited

U.S. PATENT DOCUMENTS 6,011,187 A 1/2000 Horizoe et al.
12,152,200 B2 11/2024 Jo et al.
(Continued)

FOREIGN PATENT DOCUMENTS

KR 10-0759583 B1 9/2007
KR 10-1916404 B1 11/2018
(Continued)

OTHER PUBLICATIONS

Extended European Search Report for European Patent Application No. 24162610.0 issued by the European Patent Office on Sep. 11, 2024.
(Continued)

*Primary Examiner* — Vishal V Vasisth
(74) *Attorney, Agent, or Firm* — IP&T GROUP LLP

(57) ABSTRACT

A method and associated system for producing refined hydrocarbons from waste plastics. The method and system provide for: pretreating waste plastics; producing pyrolysis gas by introducing the waste plastics pretreated in the pretreatment process into a pyrolysis reactor; producing in a lightening process pyrolysis oil by introducing the pyrolysis gas into a hot filter; and alkylating a mixed solution obtained by mixing the pyrolysis oil and olefins, wherein a liquid
(Continued)

condensed in the hot filter is re-introduced into the pyrolysis reactor. The system produces refined hydrocarbons from the waste plastics.

13 Claims, 3 Drawing Sheets

(51) Int. Cl.

| | |
|---|---|
| ***B01D 39/06*** | (2006.01) |
| ***C10B 53/07*** | (2006.01) |
| ***C10G 1/00*** | (2006.01) |

(52) U.S. Cl.

CPC ..... *C10G 1/002* (2013.01); *C10G 2300/1003* (2013.01)

(56) References Cited

U.S. PATENT DOCUMENTS

| | | | |
|---|---|---|---|
| 2015/0080624 | A1 | 3/2015 | Gephart et al. |
| 2019/0161683 | A1 | 5/2019 | Narayanaswamy et al. |
| 2022/0372383 | A1 | 11/2022 | Jeon et al. |
| 2023/0357644 | A1 | 11/2023 | Li et al. |
| 2024/0351869 | A1 | 10/2024 | Jo et al. |
| 2024/0352332 | A1 | 10/2024 | Jo et al. |
| 2024/0352345 | A1 | 10/2024 | Jo et al. |
| 2024/0352347 | A1 | 10/2024 | Jo et al. |
| 2024/0352348 | A1 | 10/2024 | Jo et al. |
| 2024/0352360 | A1 | 10/2024 | Jo et al. |
| 2025/0043191 | A1 | 2/2025 | Jo et al. |

FOREIGN PATENT DOCUMENTS

| | | | |
|---|---|---|---|
| KR | 10-2206106 | B1 | 1/2021 |
| KR | 10-2021-0057722 | A | 5/2021 |
| KR | 10-2023-0050510 | A | 4/2023 |
| WO | 2011/077419 | A1 | 6/2011 |
| WO | 2014/040634 | A1 | 3/2014 |
| WO | 2019/004560 | A1 | 1/2019 |
| WO | 2023/009398 | A1 | 2/2023 |
| WO | 2023/068842 | A1 | 4/2023 |

OTHER PUBLICATIONS

Office Action for U.S. Appl. No. 18/627,446 issued by the USPTO on Dec. 11, 2025.

Office Action for U.S. Appl. No. 18/629,942 issued by the USPTO on Mar. 10, 2026.

Office Action for U.S. Appl. No. 18/635,007 issued by the USPTO on Mar. 25, 2026.

Office Action for U.S. Appl. No. 18/629,945 issued by the USPTO on Jul. 24, 2026.

Office Action for U.S. Appl. No. 18/922,392 issued by the USPTO on Sep. 24, 2026.

METHOD AND SYSTEM FOR PRODUCING REFINED HYDROCARBONS FROM WASTE PLASTICS

CROSS-REFERENCE TO RELATED APPLICATIONS

This application claims priority under 35 U.S.C. § 119 to Korean Patent Application Nos. 10-2023-0051631 filed on Apr. 19, 2023, and 10-2023-0166857, filed on Nov. 27, 2023, in the Korean Intellectual Property Office, the disclosure of which is incorporated herein by reference in its entirety.

TECHNICAL FIELD

The following disclosure relates to a method and system for producing refined hydrocarbons from waste plastics.

BACKGROUND

Since pyrolysis oil (such as waste plastic pyrolysis oil) produced by a cracking or pyrolysis reaction of waste materials contains a large amount of impurities caused by the waste materials, there is a risk of emission of air pollutants such as $SO_x$ and $NO_x$ when the pyrolysis oil is used as a fuel. In particular, during combustion, a Cl component is often converted into HCl, which has a risk of causing device corrosion during a high-temperature treatment process, and is discharged.

In the past, Cl was removed through post-treatment processes such as a hydrodesulfurization (hydrotreating) process and a Cl treatment process using an oil refining technique. However, since pyrolysis oil such as waste plastic pyrolysis oil has a high content of Cl, problems such as equipment corrosion, abnormal reactions, and deterioration of product properties caused by an excessive amount of HCl produced in the hydrodesulfurization process have been reported, and it is difficult to introduce non-pretreated pyrolysis oil to the hydrodesulfurization process.

SUMMARY

In one general aspect of the present disclosure, a method for producing refined hydrocarbons from waste plastics includes: pretreating waste plastics; producing a pyrolysis gas by introducing the waste plastics pretreated in the pretreatment process into a pyrolysis reactor; producing in a lightening process a pyrolysis oil by introducing the pyrolysis gas into a hot filter; and alkylating a mixed solution obtained by mixing the pyrolysis oil and olefins, wherein a liquid condensed in the hot filter is re-introduced into the pyrolysis reactor.

The hot filter may be filled with beads.

The beads may include at least one or more selected from the group consisting of silica sand ($SiO_2$) and aluminum oxide ($Al_2O_3$).

A temperature gradient may be formed in the hot filter.

The temperature gradient may be formed by providing at least two heaters outside the hot filter.

The pyrolysis reactor may include at least two batch reactors.

The pyrolysis process may be performed by switching between the at least two batch reactors.

The pyrolysis oil may be mixed with petroleum hydrocarbons and alkylated as mixed oil.

The pyrolysis oil may be included in an amount of 90 wt % or less with respect to the total weight of the mixed oil.

The waste plastics may include at least one or more selected from the group consisting of polyethylene (PE), polypropylene (PP), polyethylene terephthalate (PET), polyvinyl chloride (PVC), and polystyrene (PS).

The method for producing refined hydrocarbons from waste plastics may further include, after the lightening process, a distillation process of distilling the pyrolysis oil.

Hydrocarbons derived from the pyrolysis oil separated in the distillation process and petroleum hydrocarbons may be mixed and alkylated as a mixed oil.

In another general aspect of the present disclosure, a system for producing refined hydrocarbons from waste plastics includes: a pretreatment device for pretreating waste plastics; a pyrolysis reactor for producing a pyrolysis gas by introducing the waste plastics pretreated in the pretreatment device; a hot filter for producing a pyrolysis oil by introducing the pyrolysis gas; a connection pipe connecting the hot filter and the pyrolysis reactor so that a liquid condensed in the hot filter is re-introducible into the pyrolysis reactor; and an alkylation device for alkylating a mixed solution obtained by mixing the pyrolysis oil and olefins.

The hot filter may be filled with beads.

The beads may include at least one or more selected from the group consisting of silica sand ($SiO_2$) and aluminum oxide ($Al_2O_3$).

The system may further include at least two heaters provided outside the hot filter.

Other features and aspects will be apparent from the following detailed description, the drawings, and the claims.

DETAILED DESCRIPTION OF EMBODIMENTS

Figure 1:
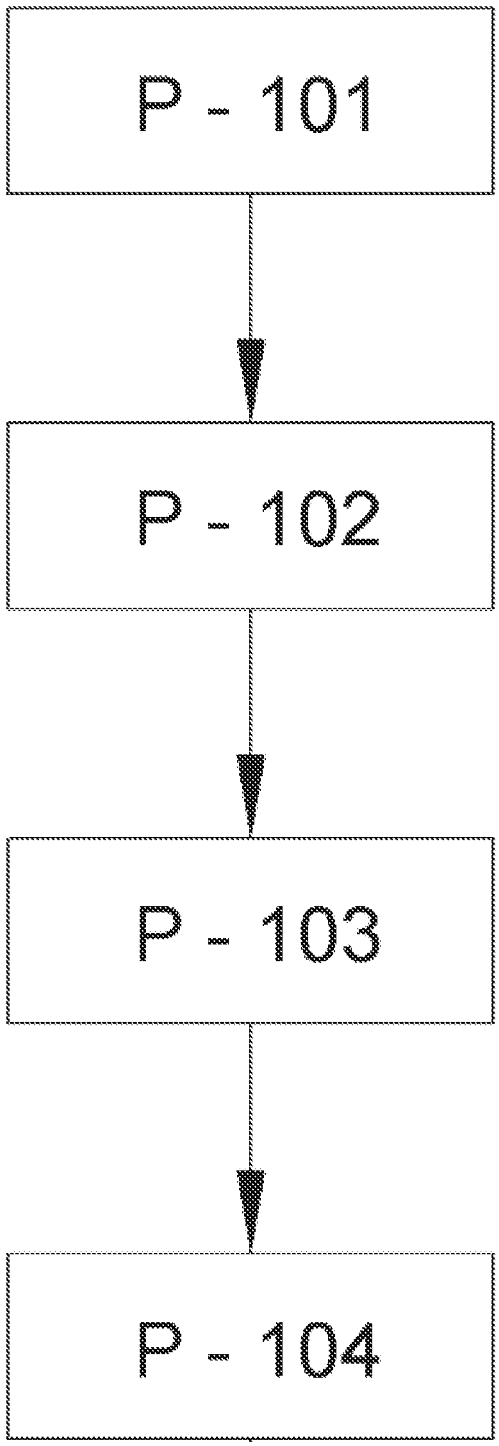
FIG. 1 is a flowchart showing a method for producing refined hydrocarbons from waste plastics according to one embodiment of the present disclosure.

The advantages and features of the present disclosure and methods for accomplishing them will become apparent from the embodiments described below in detail. However, the present disclosure is not limited to the embodiments disclosed below, but rather may be implemented in various different forms. The disclosed embodiments below are provided in order to allow those skilled in the art to make and use the present invention.

Unless defined otherwise, all terms (including technical and scientific terms) used in the present specification have the same meanings as commonly understood by those skilled in the art to which the present disclosure pertains.

Unless the context clearly indicates otherwise, the singular forms of the terms used in the present specification may be interpreted as including the plural forms.

A numerical range used in the present specification includes upper and lower limits and all values within these limits, increments logically derived from a form and span of a defined range, all double limited values, and all possible combinations of the upper and lower limits in the numerical range defined in different forms. Unless otherwise specifically defined in the present specification of the present disclosure, values out of the numerical range that may occur due to experimental errors or rounded values also fall within the defined numerical range.

The expression "comprise(s)" described in the present specification is intended to be an open-ended transitional phrase having an equivalent meaning to "include(s)", "contain(s)", "have (has)", or "are (is) characterized by", and does not exclude elements, materials, or processes, all of which are not further recited herein.

Unless otherwise defined, a unit of "%" used in the present specification refers to "wt %".

In the present specification, the description "A to B" means "A or more and B or less", and ranges from A to B, unless defined otherwise.

In the present specification, as used herein, the term "pyrolysis oil yield" refers to a weight ratio of the pyrolysis oil produced to the total weight of the oil, an aqueous by-product, a pyrolysis residue (char), and a by-product gas, that is a weight ratio of the pyrolysis oil produced to the total weight of all the products produced in the pyrolysis process.

In the present specification, the term "alkylation" broadly refers to a reaction in which an alkyl group is added to an organic molecule, and in a specific example of the present disclosure, particularly, the "alkylation" refers to a binding reaction between isoparaffins in a feedstock.

Hereinafter, a method and a system for producing refined hydrocarbons from the waste plastics of the present disclosure will be described in detail. However, this is only illustrative, and the present disclosure is not limited to the specific embodiments illustratively described by the present disclosure.

In order to remove Cl oil using conventional oil refining process, there is a need for a Cl reduction treatment technique for reducing a content of Cl in the pyrolysis oil to a level that it may be introduced into the oil refining process.

In addition, in order to secure economic feasibility in addition to impurity removal, it is desirable for the waste plastic pyrolysis oil to be a high-value product with a high proportion of light hydrocarbons. Furthermore, there is a need to develop a technique for obtaining refined hydrocarbons having a high proportion of light hydrocarbons from the waste plastic pyrolysis oil. The present invention arises in the context of these needs.

Referring to FIG. 1, the present disclosure provides a method for producing refined hydrocarbons from waste plastics, the method including: a pretreatment process (P-101) of pretreating waste plastics; a pyrolysis process (P-102) of producing a pyrolysis gas by introducing the waste plastics pretreated in the pretreatment process into a pyrolysis reactor 14; a lightening process (P-103) of producing a pyrolysis oil by introducing the pyrolysis gas into a hot filter 15; and an alkylation process (P-104) of alkylating a mixed solution obtained by mixing the pyrolysis oil and olefins, wherein a liquid condensed in the hot filter can be re-introduced into the pyrolysis reactor.

Therefore, in the method for producing refined hydrocarbons from waste plastics according to one embodiment of the present disclosure, a high-value-added pyrolysis oil having a high proportion of light hydrocarbons (as shown illustratively in the Examples below with a 57 wt % or greater of light hydrocarbons obtained) may be produced from waste plastics containing a large amount of impurities, and refined hydrocarbons having a high proportion of light hydrocarbons may be obtained therefrom. In addition, a yield of the obtained pyrolysis oil may be significantly improved relative to conventional processes used in the past.

In addition, in the method for producing refined hydrocarbons from waste plastics according to another embodiment of the present disclosure, a high-value-added pyrolysis oil with reduced impurities may be produced from waste plastics containing a large amount of impurities, and refined hydrocarbons with reduced impurities (e.g., removing 95 wt % to 99 wt % or more with respect to the impurity content in the waste plastics initially) may be obtained therefrom.

Figure 2:
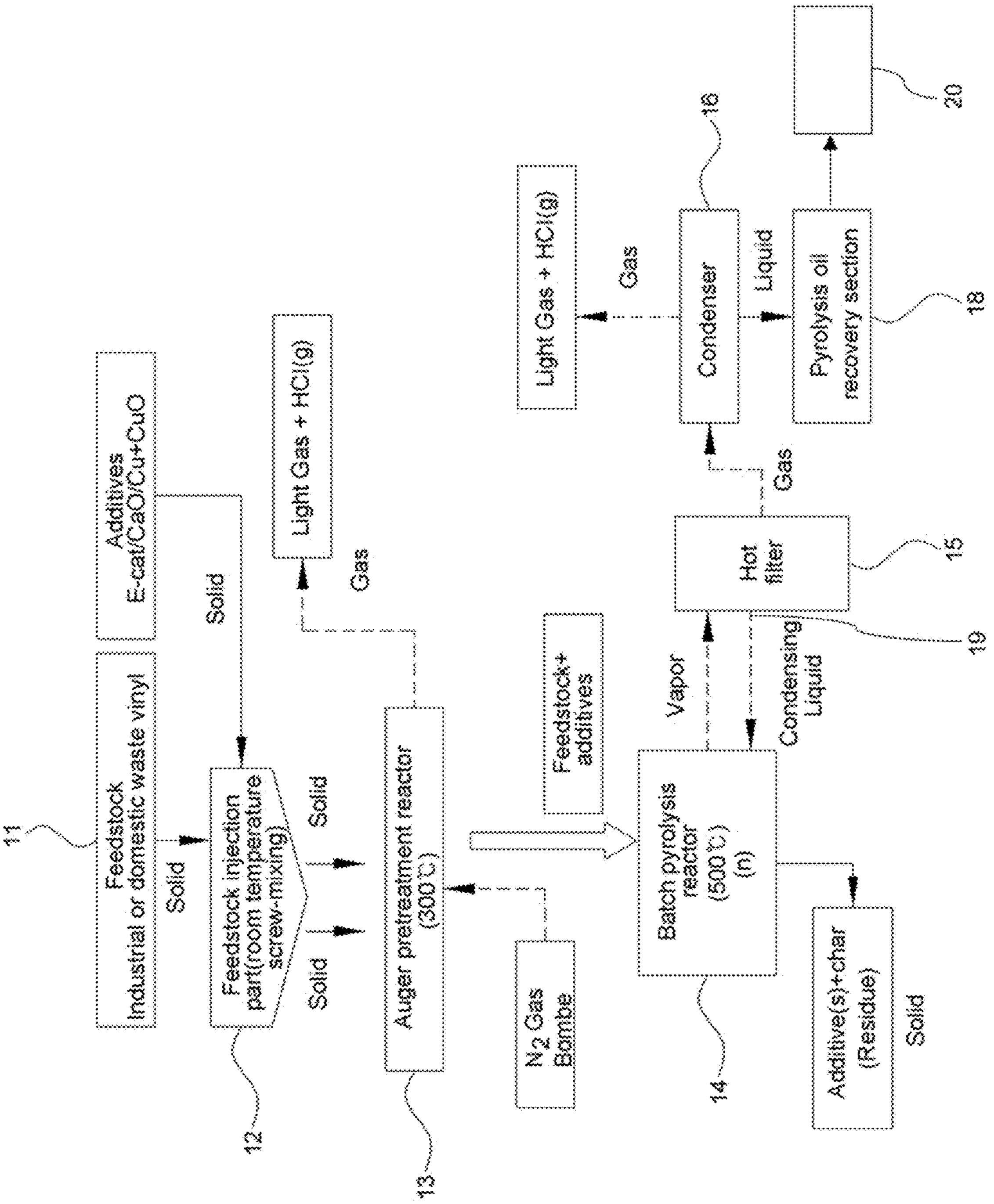
FIG. 2 is a process diagram for producing waste plastic pyrolysis oil according to another embodiment of the present disclosure.

In the method for producing refined hydrocarbons from waste plastics according to another embodiment of the present disclosure and with reference to FIG. 2, a liquid condensed in hot filter 15 can be re-introduced into pyrolysis reactor 14, such that the cracking of heavy hydrocarbons in the pyrolysis oil may be improved. Therefore, pyrolysis oil having a higher proportion of light hydrocarbons (from the lightening process inside the hot filter 15) may be produced, and refined hydrocarbons having a high proportion of light hydrocarbons may be obtained therefrom.

According to another embodiment of the present disclosure, the hot filter may be filled with beads. When the hot filter is filled with beads, an inert effect in which the beads do not chemically react with the waste plastic products and a heat transfer effect in the hot filter are maximized, which makes it possible to produce a pyrolysis oil having the above-noted high proportion of light hydrocarbons. In addition, the pyrolysis oil yield may be improved relative to conventional processes used in the past.

According to another embodiment of the present disclosure, the hot filter may be filled with the beads in an amount of 50 vol % or more, 60 vol % or more, 70 vol % or more, 80 vol % or more, 85 vol % or more, 90 vol % or more, 95 vol % or less, 93 vol % or less, 91 vol % or less, 90 vol % or less, 89 vol % or less, 87 vol % or less, 85 vol % or less, 80 vol % or less, or a value between the above numerical values with respect to an internal volume of the hot filter. Specifically, the hot filter may be filled with the beads in an amount of 70 to 95 vol %, 80 to 90 vol %, or 85 to 90 vol %, with respect to the internal volume of the hot filter, but the present disclosure is not limited thereto.

According to another embodiment of the present disclosure, a temperature gradient may be formed in the hot filter. When a temperature gradient is formed in the hot filter, the pyrolysis gas moving to the top of the hot filter and the liquid condensed to the bottom of the hot filter are efficiently circulated, which makes it possible to produce pyrolysis oil having the above-noted high proportion of light hydrocarbons. In addition, refined hydrocarbons having the above-noted high proportion of light hydrocarbons may be obtained therefrom. Further, the pyrolysis oil yield may be improved relative to conventionally observed yields from waste plastics.

According to another embodiment of the present disclosure, as for the temperature gradient, a temperature at the bottom of the hot filter may be higher than a temperature at the top of the hot filter. According to another embodiment of the present disclosure, as for the temperature gradient, the temperature at the bottom of the hot filter may be higher than a temperature at the middle of the hot filter, and the temperature at the middle of the hot filter may be higher than the temperature at the top of the hot filter. Accordingly, circulation efficiency and heat transfer efficiency in the hot filter may be improved.

Figure 3:
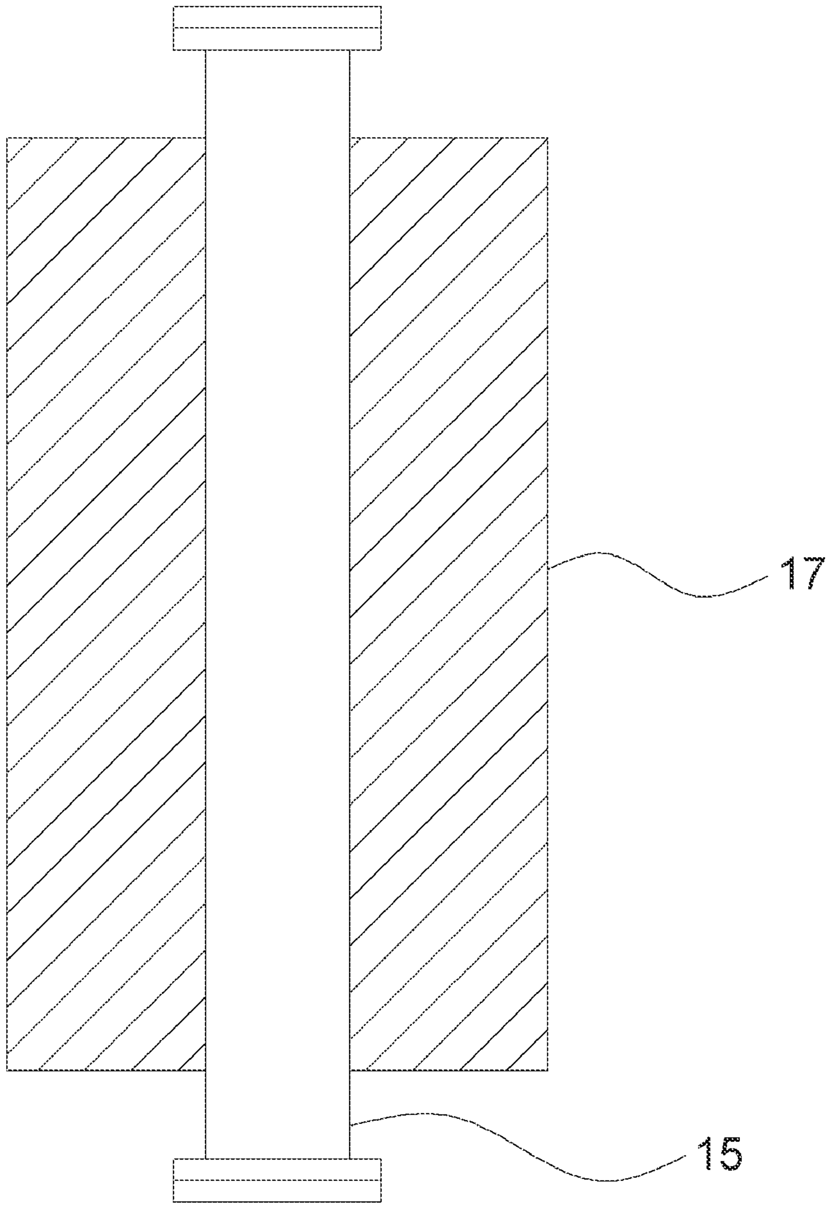
FIG. 3 is a view of a hot filter according to still another embodiment of the present disclosure.

Referring to FIG. 3, according to another embodiment of the present disclosure, the temperature gradient may be formed by providing at least two heaters 17 outside the hot filter 15. According to another embodiment of the present disclosure, the temperature gradient may be formed by providing at least three heaters outside the hot filter. When at least two heaters are provided outside the hot filter, a temperature gradient of the hot filter may be formed, and the temperatures at the top, middle, and bottom of the hot filter may be adjusted depending on operating conditions of the hot filter, such that a flexible process operation may be performed. For example, the temperature gradient of the hot filter may be formed by providing heaters at the top, middle, and bottom of the hot filter, respectively, and independently adjusting the temperatures of the top, middle, and bottom of the hot filter.

According to one embodiment of the present disclosure, the temperature at the bottom of the hot filter may be 400° C. or higher, 420° C. or higher, 440° C. or higher, 460° C. or higher, 480° C. or higher, 500° C. or higher, 550° C. or higher, 600° C. or higher, 700° C. or lower, 600° C. or lower, 550° C. or lower, 530° C. or lower, 510° C. or lower, or a value between the above numerical values.

According to another embodiment of the present disclosure, the temperature at the top of the hot filter may be 400° C. or higher, 420° C. or higher, 440° C. or higher, 460° C. or higher, 480° C. or higher, 500° C. or higher, 600° C. or lower, 550° C. or lower, 500° C. or lower, 480° C. or lower, 460° C. or lower, 440° C. or lower, 420° C. or lower, or 400° C. or lower.

According to another embodiment of the present disclosure, the temperature at the middle of the hot filter may be 300° C. or higher and 600° C. or lower, 400° C. or higher and 600° C. or lower, 400° C. or higher and 500° C. or lower, 420° C. or higher and 480° C. or lower, or 440° C. or higher and 460° C. or lower.

According to another embodiment of the present disclosure, in the pretreatment process, a process a) of reacting waste plastics with a neutralizing agent; and a process b) of reacting a product in the process a) with a copper compound may be performed. Accordingly, in the pretreatment process, a waste plastic raw material may be treated to reduce a content of Cl to a level that may be introduced into an oil refining process.

According to one embodiment of the present disclosure, in the process b), an additive or a neutralizing agent such as a metal oxide or zeolite (that is a neutralizing agent other than a copper compound) may be used. The metal oxide may be in the form of a divalent metal oxide, but the present disclosure is not limited thereto.

The waste plastics may include at least one or more selected from the group consisting of polyethylene (PE), polypropylene (PP), polyethylene terephthalate (PET), polyvinyl chloride (PVC), and polystyrene (PS). The waste plastics may include organic chlorine (organic Cl), inorganic chlorine (inorganic Cl), and/or aromatic chlorine (aromatic Cl), and a content of chlorine in the waste plastics may be 10 ppm or more, 50 ppm or more, 100 ppm or more, or 100 to 1,000 ppm, but the present disclosure is not limited thereto. Pyrolysis oil (produced through a cracking or pyrolysis reaction of waste plastics, such as waste plastic pyrolysis oil) contains a large amount of impurities caused by the impurity content in the initial waste plastics. In one particular embodiment of the present disclosure, pyrolysis oil is pretreated to remove a chlorine component such as organic/inorganic chlorine. Waste plastics may be divided into domestic waste plastic and industrial waste plastic. The domestic waste plastic is a plastic in which PVC, PS, PET, PBT, and the like in addition to PE and PP are mixed, and may refer to a mixed waste plastic containing 3 wt % or more of PVC together with PE and PP. Since chlorine derived from PVC has a high ratio of organic Cl and inorganic Cl, Cl in domestic waste plastic may be removed with high efficiency even with an inexpensive neutralizing agent(s) (Ca-based, Zn-based, or Al-based) or the like. PE/PP accounts for most industrial waste plastic, but a content of organic Cl originating from an adhesive or a dye component is high, and in particular, a ratio of Cl (aromatic chlorine) contained in an aromatic ring is high, which makes it difficult to remove Cl with the inexpensive neutralizing agent(s) described above.

In one embodiment of the present disclosure, chlorine is removed in an amount of 95 wt % or more, 97 wt % or more, 98 wt % or more, or 99 wt % or more with respect to the total weight of chlorine contained in waste plastics. To this end, it is preferable to remove chlorine contained in the aromatic ring.

According to one embodiment of the present disclosure, process a) is a process of reacting waste plastics with a neutralizing agent, and a large amount of HCl generated during melting and thermal decomposition of PVC and the like may be removed in the form of a neutralizing salt.

The neutralizing agent may be oxide, hydroxide, and carbonate of a metal, or a combination thereof, and the metal may be for example calcium, aluminum, magnesium, zinc, copper, iron, or a combination thereof. Specifically, the neutralizing agent may be copper oxide, aluminum oxide, calcium oxide, magnesium oxide, zinc oxide, or iron oxide. The neutralizing agent may contain a zeolite component. Specifically, the neutralizing agent may contain a waste fluid catalytic cracking (FCC) catalyst (E-cat) containing a zeolite component, and may further contain a waste FCC catalyst in the metal oxide. Specifically, the neutralizing agent may be calcium oxide, a waste FCC catalyst, copper metal, or copper oxide, or may be calcium oxide.

In one embodiment according to the present disclosure, the neutralizing agent may be added during the pyrolysis process.

The neutralizing agent may be mixed in an amount ranging from 0.5 to 20 wt %, 1 to 10 wt %, or 1 to 5 wt %, with respect to the total weight of the waste plastics. In addition, the neutralizing agent may be mixed at a molar ratio ($N_M/N_{Cl}$) of a metal element (M) of the neutralizing agent to a total chlorine element (Cl) in the waste plastics ranging from 1 to 25, specifically, 0.7 to 15, and more specifically, 0.5 to 5.

Meanwhile, the number of moles of total chlorine elements (Cl) in the waste plastics may refer to a total number of moles of chlorine elements in a waste plastic solid raw material before pretreatment and pyrolysis.

In the chlorine removal in the process a), a ratio ($C_1/C$) of the content $C_1$ of chlorine in the product in the process a) to 100 wt % (C) of the content of chlorine in the waste plastics may be 50% or less, 40% or less, or 20 to 30%. Chlorine remaining in waste plastics after the process a) may be effectively removed in the process b).

According to one embodiment of the present disclosure, process b) is a process of reacting the product obtained in the process a) with a copper compound, whereby organic chlorine and aromatic chlorine not removed in the process a) may be removed with a copper compound (catalyst). When a copper compound is used together with the neutralizing agent in the process a) or when a copper compound is used as a substitute for the neutralizing agent, the copper compound first reacts with chlorine and inorganic chlorine (HCl) located at the end of the hydrocarbon chain among organic chlorines, which makes it difficult for the copper compound to come into contact with aromatic chlorine or the like, which is difficult to remove with a neutralizing agent. In addition, since the initial pyrolysis performed by raising the temperature inside the reactor for pretreatment or pyrolysis starts at a relatively low temperature (250 to 300° C.), and at this time, HCl begins to be generated, it is useful to first remove chlorine with a neutralizing agent. Thereafter, when pyrolysis proceeds at higher temperatures a removal reaction of aromatic chlorine is activated. Therefore, it is effective to first remove organic Cl and inorganic Cl with HCl generated during the melting and thermal decomposition of the waste plastic using a neutralizing agent, and then remove the aromatic chlorine with a copper compound.

The copper compound may include at least one or more selected from the group consisting of copper metal (Cu), copper oxide (CuO), copper hydroxide ($Cu(OH)_2$), and copper carbonate ($CuCO_3$), and specifically, copper metal (Cu) and/or copper oxide (CuO).

The copper compound may be mixed in an amount of 0.1 to 20 wt %, 0.5 to 10 wt %, or 1 to 5 wt %, with respect to the total weight of the product in the process a). In addition, the copper compound may be mixed at a molar ratio ($N_{Cu}/N_{Cl}$) of a copper element (Cu) of the copper compound to the total chlorine element (Cl) in the waste plastics of 1 to 10, specifically, 0.7 to 5, and more specifically, 0.5 to 3.

Meanwhile, a total number of moles of chlorine element (Cl) in the waste plastics may refer to a total number of moles of chlorine element in a waste plastic solid raw material before pretreatment and pyrolysis.

In the chlorine removal in the process b), a ratio ($C_2/C$) of the content $C_2$ of chlorine in the product obtained in the process b) to 100 wt % (C) of the content of chlorine in the waste plastics may be 10% or less, 5% or less, or 0.5 to 3%.

According to another embodiment of the present disclosure, the process a) may be performed at a temperature of 200 to 320° C., and the process b) may be performed at a temperature of 400 to 550° C. When the processes a) and b) are performed in the temperature ranges, respectively, chlorine in the waste plastics may be effectively removed.

According to one embodiment of the present disclosure, in the pyrolysis process, a process a) of reacting waste plastics with a neutralizing agent; and a process b) of reacting a product in the process a) with a copper compound may be performed.

In the present disclosure, the pretreatment process may further include a crushing process of crushing the waste plastics by introducing waste plastics into a screw reactor. The crushing of the waste plastics may be performed by applying a crushing process known in the art. For example, waste plastics may be introduced into a pretreatment reactor 13 and heated to about 300° C. to produce a hydrocarbon flow precursor in the form of pellets, but the present disclosure is not limited thereto.

According to one embodiment of the present disclosure, the crushing process may be performed at room temperature.

As an example, in the crushing process, the waste plastics and the neutralizing agent may be mixed, and the mixture may be introduced into a pretreatment reactor. When the waste plastics and calcium oxide as the neutralizing agent are mixed and crushed at room temperature, a mechanochemical reaction occurs to generate hydrocarbons and CaOHCl, and therefore, an effect of stably maintaining the form of chlorine (generated from the waste plastic raw material and calcium oxide) as CaOHCl is obtained.

Subsequently, in the pretreatment process, the crushed waste plastics may be introduced into the pretreatment reactor and heated, and the solid waste plastic raw material may be physically and chemically treated to remove chlorine, thereby producing a hydrocarbon flow precursor (pyrolysis raw material). As used herein, the hydrocarbon flow precursor means a waste plastic melt, and as used herein, the waste plastic melt means that all or a part of crushed or uncrushed solid waste plastics is converted into a liquid waste plastic.

As an example, in the pretreatment process, each of the crushed or uncrushed waste plastics and the neutralizing agent may be introduced into the pretreatment reactor and heated. In addition, in the pretreatment process, the crushed or uncrushed waste plastics and the neutralizing agent may be introduced into the pretreatment reactor, and then a first pretreatment (heating) may be performed, and subsequently, a copper compound may be introduced into the pretreatment reactor, and then a second pretreatment (heating) may be performed.

The heating may be performed at a temperature of 200 to 320° C. and normal (atmospheric) pressure. Specifically, the heating may be performed at a temperature of 250 to 320° C. or 280 to 300° C., but the present disclosure is not limited thereto. In general, the pretreatment temperature of the waste plastics is at least 250° C., but hydrocarbons after the dechlorination may be pretreated even at a lower temperature of 200° C. to generate hydrogen or methane gas.

The pretreatment reactor may be an extruder, an autoclave reactor, a batch reactor, or the like, and may be, for example, an auger reactor, but the present disclosure is not limited thereto.

The pyrolysis process may be performed by introducing pyrolysis raw materials classified into three material phases: a gas phase, a liquid phase (oil+wax+water), and a solid phase into the pyrolysis reactor, and specifically, may be a process of introducing the non-pretreated or pretreated waste plastics into the pyrolysis reactor and performing heating.

As an example, the pyrolysis process may be performed by mixing pretreated waste plastics and a divalent metal compound, specifically a copper compound, introducing the mixture into a pyrolysis reactor, and heating the mixture. In addition, in the pyrolysis process, a first pyrolysis is performed by mixing waste plastics and a neutralizing agent, introducing the mixture into a pyrolysis reactor, and heating the mixture, and then a second pyrolysis is performed by introducing a divalent metal compound, specifically a copper compound, into the pyrolysis reactor and performing heating, and at least two times of pyrolysis may be performed continuously or discontinuously.

The heating may be performed at a temperature of 320 to 900° C., specifically, 350 to 700° C., and more specifically, 400 to 550° C., in a non-oxidizing atmosphere. In addition, the heating may be performed at normal pressure. The non-oxidizing atmosphere is an atmosphere in which waste plastics do not oxidize (combust), and may be, for example, an atmosphere in which an oxygen concentration is adjusted to 1 vol % or less, or an atmosphere of an inert gas such as nitrogen, water vapor, carbon dioxide, or argon.

When the heating temperature is 400° C. or higher, fusion of chlorine-containing plastics may be prevented, and conversely, when the heating temperature is 550° C. or lower, chlorine in waste plastics may remain in a pyrolysis residue (char) in the form of $XCl_2$, where X is a divalent metal cation, specifically $CaCl_2$), $CuCl_2$, or the like.

The pyrolysis may be performed in an autoclave reactor, a batch reactor, a fluidized-bed reactor, a packed-bed reactor, or the like, and specifically, any reactor capable of controlling stirring and controlling a rise in temperature may be applied. According to one embodiment of the present disclosure, the pyrolysis may be performed in a batch reactor.

According to another embodiment of the present disclosure, the pyrolysis reactor may include at least two batch reactors.

According to another embodiment of the present disclosure, the pyrolysis process may be performed by switching between the at least two batch reactors. Accordingly, the pyrolysis process may secure process continuity even at a high temperature. Specifically, if one batch reactor is undergoing maintenance, the other batch reactor can continue to operate by the switching operation.

In the method for producing refined hydrocarbons from waste plastics according to another embodiment of the present disclosure, the pyrolysis process and/or the lightening process may further include at least one or more process selected from the group consisting of a pyrolysis gas recovery process of recovering a pyrolysis gas phase and a pyrolysis liquid phase as gas and a separation process of separating a pyrolysis solid phase (solid content) into fine particles and coarse particles.

In the pyrolysis gas recovery process, pyrolysis gas containing low-boiling-point hydrocarbon compounds such as methane, ethane, and propane in the gas phase generated in the pyrolysis process or the lightening process is recovered. The pyrolysis gas may generally contain combustible materials such as hydrogen, carbon monoxide, and low-molecular-weight hydrocarbon compounds. Examples of the hydrocarbon compounds include methane, ethane, ethylene, propane, propene, butane, and butene. Such pyrolysis gas contains a combustible material and may be used as fuel.

In the separation process, the solid content in the solid phase generated in the pyrolysis process and/or the lightening process, for example, carbides, the neutralizing agent, and/or the copper compound may be separated into fine particles and coarse particles. Specifically, classification is performed using a sieve having a size smaller than an average particle diameter of the chlorine-containing plastics and larger than an average particle diameter of the neutralizing agent or the copper compound, such that the solid content generated by the pyrolysis reaction may be separated into fine particles and coarse particles. In the separation process, it is useful to separate the solid content into fine particles containing a relatively large amount of the chlorine-containing neutralizing agent and the copper compound, and coarse particles containing a relatively large amount of carbides. The fine particles and carbides may be retreated as necessary, reused in the pyrolysis process, used as fuel, or disposed of as waste, but the present disclosure is not limited thereto.

According to one embodiment of the present disclosure, the hot filter may be filled with at least one or more selected from the group consisting of beads and a neutralizing agent.

According to another embodiment of the present disclosure, the hot filter may be filled with beads. When the hot filter is filled with beads, an inert effect and a heat exchange effect in the hot filter are maximized, which makes it possible to produce pyrolysis oil having the above noted high proportion of light hydrocarbons.

According to one embodiment of the present disclosure, the beads may include at least one or more selected from the group consisting of silica sand ($SiO_2$) and aluminum oxide ($Al_2O_3$). Specifically, when the beads include silica sand ($SiO_2$), the inert effect and the heat exchange effect in the hot filter may be maximized, and a stable process operation may be performed without wear even during a long-term high-temperature operation.

According to another embodiment of the present disclosure, the beads may be glass beads, but the beads in the present disclosure are not limited thereto.

According to one embodiment of the present disclosure, a diameter of the bead may be 0.1 mm or more, 1 mm or more, 1.5 or more, 2 mm or more, 2.5 mm or more, 3 mm or more, 10 mm or less, 8 mm or less, 6 mm or less, 4 mm or less, 3.5 mm or less, 3 mm or less, 2.5 mm or less, 2 mm or less, or a value between the above numerical values, and specifically, may be 1 mm to 5 mm, 2 mm to 4 mm, or 2.5 mm to 3.5 mm, but the present disclosure is not limited thereto. In the lightening process of the present disclosure, the hot filter is filled with beads having the particle size described above, such that lightening of the pyrolysis oil may be achieved by adjusting a gas hourly space velocity (GHSV) of the pyrolysis gas (where GHSV is calculated by dividing a volumetric gas flow rate per hour by the volume of the catalyst), and process operation efficiency may be improved due to suppression of a differential pressure in the hot filter.

According to another embodiment of the present disclosure, in the lightening process, pyrolysis oil may be produced by introducing the pyrolysis gas into the hot filter filled with a neutralizing agent.

The lightening process may be performed in an oxygen-free atmosphere at a temperature of 400 to 550° C. and a pressure of normal pressure to 0.5 bar, and the oxygen-free atmosphere may be an inert gas atmosphere or a closed system atmosphere without oxygen. In the temperature range described above for the lightening process, the lightening of the pyrolysis gas is performed well, such that clogging and a differential pressure caused by wax may be suppressed.

Meanwhile, in the lightening process, a gas hourly space velocity (GHSV) may be 0.3 to 1.2/hr or 0.5 to 0.8/hr. Accordingly, it is possible to lighten a waste plastic pyrolyzed product and reduce impurities (Cl and the like) without performing an additional post-treatment process, and it is possible to produce pyrolysis oil having the above-noted high proportion of light hydrocarbons and refined hydrocarbons having a high proportion of light hydrocarbons by adjusting the GHSV of the pyrolysis gas.

The neutralizing agent filled in the hot filter may have a particle size of 400 to 900 μm, or may have a particle size of 500 to 800 μm. Under the operating conditions in one embodiment of the lightening process of the present disclosure, the hot filter is filled with the neutralizing agent having the particle size described above, such that lightening of the pyrolysis oil may be achieved by adjusting the GHSV of the pyrolysis gas, and process operation efficiency may be improved due to suppression of a differential pressure in the hot filter.

Meanwhile, the particle size may refer to D50, where D50 refers to a particle diameter when a cumulative volume from a small particle size accounts for 50% in measuring a particle size distribution by a laser scattering method. In this case, as for D50, the particle size distribution may be measured by collecting the sample from the prepared carbonaceous material according to KS A ISO 13320-1 standard using Mastersizer 3000 manufactured by Malvern Panalytical Ltd. Specifically, ethanol may be used as a solvent, and if necessary, the ethanol can be dispersed using an ultrasonic disperser, and then, a volume density may be measured.

According to another embodiment of the present disclosure, the hot filter may be filled with the beads and the neutralizing agent.

The hot filter generally serves to separate pyrolysis gas and a residue (char) among pyrolyzed products such as those known in the art. However, in the present disclosure, a hot filter filled with at least one or more selected from the group consisting of beads and a neutralizing agent is applied for removal of impurities (Cl) as well as lightening, and therefore, as described above, operating conditions such as a temperature of the hot filter and a particle size of the neutralizing agent can be adjusted to specific ranges.

The lightening process may satisfy the following Relational Expressions 1 and 2.

$$50 < (A_2 - A_1)/A_1\ (\%) < 100 \quad \text{[Relational Expression 1]}$$

$$-80 < (B_2 - B_1/B_1)\ (\%) < -50 \quad \text{[Relational Expression 2]}$$

In Relational Expression 1, $A_1$ represents a total amount (wt %) of naphtha (boiling point (bp) of 150° C. or lower) and kerosene (bp of 150 to 265° C.) of the pyrolysis gas, and $A_2$ represents a total amount (wt %) of naphtha (bp of 150° C. or lower) and kerosene (bp of 150 to 265° C.) of the pyrolysis oil, and in Relational Expression 2, $B_1$ represents a content (ppm) of chlorine in the pyrolysis gas, and $B_2$ represents a content (ppm) of chlorine in the pyrolysis oil.

Specifically, Relational Expressions 1 and 2 may be $60<(A_2-A_1)/A_1\ (\%)<90$, $65<(A_2-A_1)/A_1\ (\%)<85$, or $70<(A_2-A_1)/A_1\ (\%)<80$, and $-75<(B_2-B_1/B_1)\ (\%)<-55$, $-70<(B_2-B_1/B_1)\ (\%)<-55$, or $-65<(B_2-B_1/B_1)\ (\%)<-55$, respectively.

Relational Expressions 1 and 2 numerically represent a degree of light and heavy of the waste plastic pyrolyzed products when the hot filter filled with at least one or more selected from the group consisting of beads and a neutralizing agent of the present disclosure is used. The present disclosure in one embodiment has a technical feature of producing pyrolysis oil having the above-noted high proportion of light hydrocarbons by controlling the oil composition and the content of chlorine in the pyrolysis gas introduced into the hot filter and the organic/inorganic materials containing chlorine.

The pyrolysis oil produced in the lightening process may include, with respect to the total weight, 30 to 50 wt % of naphtha (bp of 150° C. or lower), 30 to 50 wt % of kerosene (bp of 150 to 265° C.), 10 to 30 wt % of light gas oil (LGO) (bp of 265 to 380° C.), and 0 to 10 wt % of UCO (Unconverted oil)/AR (Atmospheric residue) (bp of 380° C. or higher), and specifically, may include 35 to 50 wt % of naphtha (bp of 150° C. or lower), 35 to 50 wt % of kerosene (bp of 150 to 265° C.), 10 to 30 wt % of light gas oil (LGO) (bp of 265 to 380° C.), and 0 to 8 wt % of UCO-2/AR (bp of 380° C. or higher) or 35 to 45 wt % of naphtha (bp of 150° C. or lower), 35 to 45 wt % of kerosene (bp of 150 to 265° C.), 10 to 20 wt % of light gas oil (LGO) (bp of 265 to 380° C.), and 0 to 6 wt % of UCO-2/AR (bp of 380° C. or higher). In addition, in the pyrolysis gas, a weight ratio of light oils (the sum of naphtha and kerosene) to heavy oils (the sum of LGO and UCO-2/AR) may be 2.5 to 5, 2.5 to 4, or 3 to 3.8.

In the pyrolysis oil produced in the lightening process, a total content of chlorine may be less than 100 ppm, 80 ppm or less, 60 ppm or less, 5 to 50 ppm, or 10 to 50 ppm, with respect to the total weight, and a content of organic chlorine may be less than 90 ppm, 70 ppm or less, 50 ppm or less, 5 to 50 ppm, or 5 to 40 ppm, with respect to the total weight.

According to another embodiment of the present disclosure, the pyrolysis process and the lightening process may satisfy the following Relational Expression 3.

$$0.7 < T_2/T_1 < 1.3 \quad \text{[Relational Expression 3]}$$

In Expression 3, $T_1$ and $T_2$ are the respective temperatures at which the pyrolysis process and the lightening process are performed.

In a case where the pyrolysis process and the lightening process are performed so that the $T_2/T_1$ value satisfies 0.7 or less, the temperature of the pyrolysis process may be relatively high, or the temperature of the lightening process may be relatively low. In this case, a ratio of pyrolysis oil that is condensed in the hot filter and then circulated to the pyrolysis reactor increases, and thus, a final boiling point of the pyrolysis oil may be excessively low. On the other hand, the pyrolysis process and the lightening process are performed so that the $T_2/T_1$ value satisfies 1.3 or more, a loss ratio of the pyrolysis oil in a gas phase may excessively increase, and thus, the pyrolysis oil yield may be reduced.

Specifically, $T_2/T_1$ may be, for example, 0.7 to 1.2, 0.8 to 1.2, 0.8 to 1.1, 0.9 to 1.1, or 1. Therefore, the effects described above may be further improved.

According to another embodiment of the present disclosure, the method for producing refined hydrocarbons from waste plastics of the present disclosure may include an alkylation process.

The alkylation process may be a process of alkylating a mixed solution obtained by mixing the pyrolysis oil and olefins.

The mixed solution according to one embodiment of the present disclosure may be obtained by mixing a refined fraction separated by distilling the pyrolysis oil and olefins.

The refined fraction according to another embodiment of the present disclosure may be at least one or more selected from the group consisting of naphtha, kerosene, light gas oil, vacuum gas oil (VGO), heavy gas oil (HGO), and residue, but the present disclosure is not limited thereto.

The mixed solution according to one embodiment of the present disclosure may be obtained by further mixing petroleum hydrocarbons.

The petroleum hydrocarbon refers to a mixture of naturally occurring hydrocarbons or a compound separated from the mixture. Specifically, the petroleum hydrocarbon may be at least one or more selected from the group consisting of crude oil, and naphtha, kerosene, light gas oil, vacuum gas oil (VGO), heavy gas oil, and vacuum gas oil (VGO) derived from crude oil, but the present disclosure is not limited thereto.

In the mixed solution according to one embodiment of the present disclosure, a weight ratio ($w_{pyrolysis\ oil}/w_{petroleum}$) of the pyrolysis oil to the petroleum hydrocarbons may be 0.00001 or more, 0.0001 or more, 0.001 or more, 0.01 or more, 0.05 or more, 0.10 or more, 0.25 or more, 0.5 or more, or 1 or more, and an upper limit thereof may be, but the present disclosure is not limited to, 20 or less or 10 or less. However, in general, the lower the content of impurities in the pyrolysis oil, the higher the proportion of pyrolysis oil which may be mixed, and the same may be applied to the refined fraction.

The olefins according to one embodiment of the present disclosure are not particularly limited as long as they are used in alkylation in the art, and specifically, may be C3 to C5 olefins.

The mixed solution according to another embodiment of the present disclosure may include the olefins in an amount of 30 wt % or more, 40 wt % or more, 50 wt % or more, or 55 wt % or more, with respect to the total weight of the mixed solution, and an upper limit thereof may be, but the present disclosure is not limited to, 70 wt % or less or 60 wt % or less, but the present disclosure is not limited to the above range (s).

A temperature at which the alkylation according to one embodiment of the present disclosure is performed may be 15° C. or higher, 100° C. or higher, 200° C. or higher, 300° C. or higher, 400° C. or lower, or a value between the above numerical ranges, but the present disclosure is not limited thereto.

In addition, the alkylation according to one embodiment of the present disclosure may be performed at a pressure of 1 bar to 100 bar, and specifically, 3 bar to 50 bar, but the present disclosure is not limited thereto.

The alkylation according to one embodiment of the present disclosure may be performed under a condition in which a retention time of the mixed solution is 10 seconds or shorter, and specifically, 0.01 to 10 seconds.

The alkylation according to another embodiment of the present disclosure may be performed in the presence of an alkylation catalyst.

The mixed solution according to another embodiment of the present disclosure contains isoparaffin, and a content of paraffin (n-paraffin and isoparaffin) may be 40 to 50 wt % with respect to the total weight of the mixed solution, but the present disclosure is not limited thereto. The mixed solution may be used as a feedstock for an alkylation reaction without any additional treatment, but in some cases, an isomerization treatment may be selectively performed to satisfy a desired content level of isoparaffin.

The alkylation according to one embodiment of the present disclosure may be performed in the presence of a peroxide satisfying the following Chemical Formula 1 as a radical initiator.

ROOR' [Chemical Formula 1]

Where, R and R' may be independently hydrogen, an alkyl group having 1 to 10 carbon atoms (specifically, an alkyl group having 1 to 4 carbon atoms), or an acetyl group having 1 to 10 carbon atoms (specifically, an acetyl group having 1 to 6 carbon atoms).

Examples of the peroxide according to one embodiment of the present disclosure include hydrogen peroxide, dimethyl peroxide, diethyl peroxide, di-t-butyl peroxide, and benzoyl peroxide, but the peroxides of the present disclosure are not limited thereto.

The peroxide according to another embodiment of the present disclosure may be mixed with the mixed solution and introduced into a reaction system, or may be introduced separately into the reaction system. In this case, the amount of peroxide used may be 5 to 35 wt %, specifically, 15 to 30 wt %, and more specifically, 20 to 30 wt %, with respect to the total reactant. As the amount of peroxide used increases, a degree of alkylation also tends to increase. However, when an excessively large amount of peroxide is used, a kinematic viscosity may become excessively high.

The alkylation according to one embodiment of the present disclosure may be performed in a batch or continuous mode. In the batch mode, the reaction time may be, for example, 0.5 to 5 hours, specifically, 0.5 to 4 hours, and more specifically, 1 to 2 hours, and in addition, in the continuous mode, a weight hourly space velocity (WHSV) (that is the amount of feed/hr divided by the amount of peroxide/catalyst) may be adjusted to, for example, 0.2 to 2 $hr^{-1}$, specifically, 0.25 to 2 $hr^{-1}$, and more specifically, 0.5 to 1 $hr^{-1}$. In addition, a conversion rate during the alkylation may be, for example, 20 to 50%, and specifically, 30 to 40%.

The alkylation according to one embodiment of the present disclosure may be performed in the presence of a Lewis acid or zeolite-based catalyst such as HF and $H_2SO_4$.

In one embodiment of the present disclosure, the pyrolysis oil may be mixed with petroleum hydrocarbons and alkylated as mixed oil.

In the mixed oil according to one embodiment of the present disclosure, the pyrolysis oil may be included in an amount of 0.01 wt % or more, 0.1 wt % or more, 1 wt % or more, 5 wt % or more, 10 wt % or more, 20 wt % or more, 40 wt % or more, or 50 wt % or more, with respect to the total weight of the mixed oil, and an upper limit thereof may be, but the present disclosure is not limited to, 95 wt % or less, 90 wt % or less, 60 wt % or less, 50 wt % or less, or 40 wt % or less. The present disclosure is not limited to the above range. However, in general, the lower the content of impurities in the pyrolysis oil, the higher the proportion of pyrolysis oil that may be included in the mixed oil.

The method for producing refined hydrocarbons from waste plastics according to another embodiment of the present disclosure may further include, after the lightening process, a distillation process of distilling the pyrolysis oil.

In the method for producing refined hydrocarbons from waste plastics according to another embodiment of the present disclosure, hydrocarbons derived from the pyrolysis oil separated in the distillation process and petroleum hydrocarbons may be mixed and alkylated as mixed oil.

According to another embodiment of the present disclosure, in the distillation process, the pyrolysis oil may be distilled to obtain refined hydrocarbons in the form of naphtha at a boiling point of 150° C. or lower, kerosene at a boiling point of 150 to 265° C., light gas oil (LGO) at a boiling point of 265 to 340° C., and vacuum gas oil (VGO) at a boiling point of 340° C. or higher. In addition, in the distillation process, the pyrolysis oil may be distilled to obtain light gas oil having a boiling point of 230 to 380° C.

In addition, the present disclosure in one embodiment provides a system for producing refined hydrocarbons from waste plastics. A description of contents overlapped with those described in the method for producing refined hydrocarbons from waste plastics may be applied in the same manner.

The present disclosure in this embodiment provides a system for producing refined hydrocarbons from waste plastics, the system including: a pretreatment device pretreating waste plastics; a pyrolysis reactor for producing a pyrolysis gas by introducing the waste plastics pretreated in the pretreatment device; a hot filter for producing a pyrolysis oil by introducing the pyrolysis gas; a connection pipe connecting the hot filter and the pyrolysis reactor so that a liquid condensed in the hot filter can be re-introduced into the pyrolysis reactor; and an alkylation device for alkylating a mixed solution obtained by mixing the pyrolysis oil and olefins.

The system of the present disclosure may produce a high-value-added pyrolysis oil having the above-noted high proportion of light hydrocarbons from waste plastics containing a large amount of impurities, and may produce refined hydrocarbons having a high proportion of light hydrocarbons therefrom. In addition, the system of the present disclosure may improve a yield of the pyrolysis oil obtained from the waste plastics.

Referring to FIG. 2, a feedstock 11 may be injected into a feedstock injection part 12, and screw-mixing may be performed. The crushed waste plastics and additives may be introduced into a pretreatment reactor 13, and then pretreatment may be performed. The pretreated waste plastics may be introduced into a pyrolysis reactor 14 and pyrolysis may be performed to produce pyrolysis gas. The produced pyrolysis gas may be introduced into a hot filter 15 and then lightened. Thereafter, the lightened pyrolysis gas may flow into a condenser 16, and pyrolysis oil may be obtained in a pyrolysis oil recovery section 18. A liquid condensed in the hot filter 15 may be re-introduced into the pyrolysis reactor 14 through the connection pipe 19. And then the pyrolysis oil or mixed oil obtained by mixing the pyrolysis oil and oil derived from crude oil may be alkylated in the alkylation device 20.

According to one embodiment of the present disclosure, the hot filter may be filled with beads. When the hot filter is filled with beads, an inert effect and a heat transfer effect in the hot filter are maximized, which makes it possible to produce pyrolysis oil having the above-noted high proportion of light hydrocarbons. In addition, the pyrolysis oil yield may be improved.

According to one embodiment of the present disclosure, the beads may include at least one or more selected from the group consisting of silica sand ($SiO_2$) and aluminum oxide ($Al_2O_3$).

According to another embodiment of the present disclosure, the system may further include at least two heaters provided outside the hot filter. In addition, the system may include at least three heaters outside the hot filter. When at least two heaters are provided outside the hot filter, a temperature gradient of the hot filter may be formed, and the temperatures at the top, middle, and bottom of the hot filter may be adjusted depending on operating conditions of the hot filter, such that a flexible process operation may be performed.

Hereinafter, examples of the present disclosure will be further described with reference to specific experimental examples. The examples and comparative examples included in the experimental examples are merely illustrative of the present disclosure, and various modifications and alterations may be made without departing from the scope of the present disclosure.

In the present specification, as used herein, the term “pyrolysis oil yield” refers to a weight ratio of oil produced to the total weight of the oil produced, any aqueous by-product, any pyrolysis residue (char), and any by-product gas (among the products in the pyrolysis process).

Example 1

78.8 wt % of PE, 11.6 wt % of PP, and 3.1 wt % of PVC were contained in industrial waste plastics used as a feedstock.

1,020 g of the industrial waste plastic feedstock was injected into a feedstock injection port and screw-mixing was performed. The crushed waste plastics and CaO were introduced into an auger reactor at 200 g/hr and 10 g/hr, respectively, and then a pretreatment was performed at a screw speed of 10 rpm, a nitrogen flow rate of 3 cc/min, 300° C., and a residence time of 1 hr.

The pretreated waste plastics were introduced into a rotary kiln batch pyrolysis reactor, and pyrolysis was performed at a rotary kiln rotation speed of 4 rpm and 430° C., thereby producing pyrolysis gas.

The produced pyrolysis gas was introduced into a 1.3 L hot filter not filled with glass beads and then lightened, and then pyrolysis oil was obtained in a recovery section. A liquid condensed in the hot filter was re-introduced into the pyrolysis reactor.

The yield of the pyrolysis oil is shown in Table 1, and the result of GC-Simdis analysis (HT 750) to confirm the molecular weight distribution of the pyrolysis oil is shown in Table 2.

Mixed oil was obtained by mixing the pyrolysis oil and naphtha having a boiling point of 150° C. or lower derived from crude oil at a weight ratio of 5:95. A mixed solution was prepared by mixing the mixed oil and propylene (manufacturer: SK geo centric Co., Ltd.) at a weight ratio of 4:6.

The mixed solution and di-t-butyl peroxide were mixed at a weight ratio of 80:20, the mixture was introduced into an alkylation reactor, and then alkylation was performed under conditions of room temperature and 5 bar in the presence of $H_2SO_4$ in a nitrogen atmosphere, thereby producing refined hydrocarbons.

Example 2

A process was performed in the same manner as that of Example 1, except that a 1.3 L hot filter was filled with glass beads having a diameter of 3 mm at 88 vol % with respect to the internal volume of the hot filter, and the top temperature, the middle temperature, and the bottom temperature of the hot filter were maintained at 430° C.

Example 3

A process was performed in the same manner as that of Example 1, except that a 1.3 L hot filter was filled with glass beads having a diameter of 3 mm at 88 vol % with respect to the internal volume of the hot filter, the top temperature of the hot filter was maintained at 430° C., and the middle temperature and the bottom temperature of the hot filter were maintained at 500° C.

Example 4

A process was performed in the same manner as that of Example 1, except that a 1.3 L hot filter was filled with glass beads having a diameter of 3 mm at 88 vol % with respect to the internal volume of the hot filter, the top temperature of the hot filter was maintained at 430° C., the middle temperature of the hot filter was maintained at 450° C., and the bottom temperature of the hot filter was maintained at 500° C.

Example 5

A process was performed in the same manner as that of Example 1, except that mixed oil obtained by mixing naphtha having a boiling point of 150° C. or lower derived from pyrolysis oil separated by distilling the pyrolysis oil and naphtha having a boiling point of 150° C. or lower derived from crude oil at a weight ratio of 5:95 was used.

Comparative Example 1

A process was performed in the same manner as that of Example 1, except that the liquid condensed in the hot filter was not re-introduced into the pyrolysis reactor.

Measurement Methods

The composition of the waste plastic feedstock was analyzed using Flake analyzer available from RTT System GmbH, Germany, among NIR analyzers.

GC-Simdis analysis (HT 750) was performed to confirm the composition of pyrolyzed products related to pyrolysis oil yield measurement.

In order to analyze impurities such as Cl, S, N, and O, ICP, TNS, EA-O, and XRF analysis were performed. The total content of Cl was measured according to ASTM D5808, the content of N was measured according to ASTM D4629, and the content of S was measured according to ASTM D5453.

TABLE 1

| | Comparative Example 1 | Example 1 | Example 2 | Example 3 | Example 4 |
|---|---|---|---|---|---|
| Pyrolysis oil yield (wt %) | 52.1 | 55.1 | 57.0 | 60.8 | 62.4 |

TABLE 2

| Pyrolysis oil composition ratio (wt %) | Comparative Example 1 | Example 1 | Example 2 | Example 3 | Example 4 |
|---|---|---|---|---|---|
| Naphtha (boiling point of 150° C. or lower) | 23.4 | 28.3 | 35.2 | 40.1 | 40.3 |
| Kerosene (boiling point of 150 to 265° C.) | 34.2 | 37.4 | 35.4 | 42.1 | 44.6 |
| LGO (boiling point of 265 to 340° C.) | 23.1 | 20.1 | 15.1 | 9.6 | 10 |
| VGO (boiling point of 340° C. or higher) | 19.3 | 14.2 | 14.3 | 8.2 | 5.1 |
| Total of naphtha and kerosene | 57.6 | 65.7 | 70.6 | 82.2 | 84.9 |

In Comparative Example 1 in which the hot filter was not filled with beads and the liquid condensed in the hot filter was not re-introduced into the pyrolysis reactor, the pyrolysis oil yield and the proportion of light oil including naphtha and kerosene were the lowest.

In the case of Example 1 in which the liquid condensed in the hot filter was re-introduced into the pyrolysis reactor, an excellent pyrolysis oil yield and an excellent proportion of light hydrocarbons including naphtha and kerosene were achieved compared to Comparative Example 1.

In the case of Example 1 in which the liquid condensed in the hot filter was re-introduced into the pyrolysis reactor, an excellent pyrolysis oil yield and an excellent proportion of light hydrocarbons including naphtha and kerosene were achieved compared to Comparative Example 1.

In Examples 3 and 4 in which the liquid condensed in the hot filter was re-introduced into the pyrolysis reactor, the hot filter was filled with beads, and a temperature gradient was formed in the hot filter, the pyrolysis oil yield and the proportion of light hydrocarbons including naphtha and kerosene were superior to those in Examples 1 and 2.

In particular, in Example 4 in which the top temperature, the middle temperature, and the bottom of the hot filter were maintained at 430° C., 450° C., and 500° C., respectively, the pyrolysis oil yield and the proportion of light hydrocarbons including naphtha and kerosene were the best.

In addition, high-quality refined hydrocarbons were produced through the alkylation process.

As set forth above, according to various embodiments of the present disclosure, a high-value-added pyrolysis oil having the above-noted high proportion of light hydrocarbons may be produced from waste plastics containing a large amount of impurities, and refined hydrocarbons having the high proportion of light hydrocarbons may be obtained therefrom.

According to one embodiment of the present disclosure, a yield of the pyrolysis oil obtained from waste plastics may be improved as compared to conventional yields from waste plastics.

According to another embodiment of the present disclosure, a high-value-added pyrolysis oil with reduced impurities may be produced from waste plastics containing a large amount of impurities, and refined hydrocarbons with reduced impurities may be obtained therefrom.

According to another embodiment of the present disclosure, when refined hydrocarbons are produced from waste plastics, a process may be simplified.

According to one embodiment of the present disclosure, a high-value-added pyrolysis oil (having the above-noted high proportion of light hydrocarbons that may be used as a feedstock for blending with existing petroleum products or for an oil refining process due to its excellent quality may be produced, and refined hydrocarbons having the high proportion of light hydrocarbons may be obtained therefrom.

According to another embodiment of the present invention, high-octane refined hydrocarbons may be obtained from waste plastics.

The method and the system for producing refined hydrocarbons from waste plastics according to another embodiment of the present disclosure may be used to produce eco-friendly petrochemical products using waste plastics as a feedstock.

The content described above is merely an example of applying the principles of the present disclosure, and other configurations may be used.

What is claimed is:

1. A method for producing refined hydrocarbons from waste plastics, the method comprising:

pretreating the waste plastics by removing chlorine from the waste plastics to provide pretreated plastics;

producing a pyrolysis gas by introducing the pretreated plastics into a pyrolysis reactor;

producing, in a lightening process, a pyrolysis oil by introducing the pyrolysis gas directly into a hot filter; and alkylating a mixed solution comprising the pyrolysis oil and olefins, wherein a liquid condensed in the hot filter is re-introduced into the pyrolysis reactor.

2. The method of claim 1, wherein the hot filter is filled with beads.

3. The method of claim 2, wherein the beads include at least one selected from the group consisting of silica sand ($SiO_2$) and aluminum oxide ($Al_2O_3$).

4. The method of claim 1, wherein a temperature gradient is formed in the hot filter.

5. The method of claim 4, wherein the temperature gradient is formed by providing at least two heaters outside the hot filter.

6. The method of claim 1, wherein the pyrolysis reactor includes at least two batch reactors.

7. The method of claim 6, wherein the pyrolysis process is performed by switching operations between the at least two batch reactors.

8. The method of claim 1, wherein the olefins comprises petroleum hydrocarbons.

9. The method of claim 1, wherein the mixed solution includes pyrolysis oil in an amount of 90 wt % or less with respect to the total weight of the mixed solution.

10. The method of claim 1, wherein the waste plastics include at least one selected from the group consisting of polyethylene (PE), polypropylene (PP), polyethylene terephthalate (PET), polyvinyl chloride (PVC), and polystyrene (PS).

11. The method of claim 1, further comprising, after the lightening process, distilling the pyrolysis oil to provide hydrocarbons.

12. The method of claim 11, wherein the hydrocarbons are included in the mixed solution.

13. The method of claim 1, wherein the pyrolysis reactor is heated at a temperature of 400 to 550° C.

* * * * *